United States Patent
Nakra et al.

(12) 
(10) Patent No.: US 12,282,428 B2
(45) Date of Patent: Apr. 22, 2025

(54) SELECTIVE SPECULATIVE PREFETCH REQUESTS FOR A LAST-LEVEL CACHE

(71) Applicant: ADVANCED MICRO DEVICES, INC., Santa Clara, CA (US)

(72) Inventors: Tarun Nakra, Santa Clara, CA (US); Akhil Arunkumar, Santa Clara, CA (US); Paul Moyer, Santa Clara, CA (US); Jay Fleischman, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 18 days.

(21) Appl. No.: 17/564,141

(22) Filed: Dec. 28, 2021

(65) Prior Publication Data
US 2023/0205700 A1 Jun. 29, 2023

(51) Int. Cl.
*G06F 12/08* (2016.01)
*G06F 9/30* (2018.01)
*G06F 9/38* (2018.01)
*G06F 12/0811* (2016.01)
*G06F 12/0862* (2016.01)

(52) U.S. Cl.
CPC ...... *G06F 12/0862* (2013.01); *G06F 9/30047* (2013.01); *G06F 9/3842* (2013.01); *G06F 12/0811* (2013.01); *G06F 2212/1021* (2013.01)

(58) Field of Classification Search
CPC ............. G06F 12/0862; G06F 12/0811; G06F 2212/1021; G06F 9/3842; G06F 9/30047; G06F 9/383; G06F 2212/502; G06F 2212/507; G06F 2212/6024; G06F 2212/6028; G06F 12/084
USPC ......................................................... 711/137
See application file for complete search history.

(56) References Cited

U.S. PATENT DOCUMENTS

| | | | |
|---|---|---|---|
| 10,963,392 B1* | 3/2021 | Gupta | G06F 12/0888 |
| 2015/0143057 A1* | 5/2015 | Pavlou | G06F 9/383 |
| | | | 711/137 |
| 2018/0095893 A1* | 4/2018 | Dooley | G06F 12/0897 |
| 2022/0197808 A1* | 6/2022 | Alam | G06F 12/0862 |

* cited by examiner

*Primary Examiner* — Hua J Song

(57) ABSTRACT

In response to generating one or more speculative prefetch requests for a last-level cache, a processor determines prefetch analytics for the generated speculative prefetch requests and compares the determined prefetch analytics of the speculative prefetch requests to selection thresholds. In response to a speculative prefetch request meeting or exceeding a selection threshold, the processor selects the speculative prefetch request for issuance to a memory-side cache controller. When one or more system conditions meet one or more condition thresholds, the processor issues the selected speculative prefetch request to the memory-side cache controller. The memory-side cache controller then retrieves the data indicated in the selected speculative prefetch request from a memory and stores it in a memory-side cache in the data fabric coupled to the last-level cache.

20 Claims, 5 Drawing Sheets

SELECTIVE SPECULATIVE PREFETCH REQUESTS FOR A LAST-LEVEL CACHE

BACKGROUND

Within a processor cache hierarchy, to address cache misses for higher-level caches, processors issue prefetch requests for the memory addresses that identify data likely to be accessed by the processors. Once the data identified in the prefetch requests is retrieved from a memory, the resulting prefetch fills are stored in one or more lower-level caches. As such, the prefetch fills may be retrieved from the lower-level caches when a cache miss occurs in the higher-level caches. However, when a cache miss occurs for a last-level cache, the data must be retrieved from a memory, causing significant lag times, and reducing the processing efficiency of the processor.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

DETAILED DESCRIPTION

Techniques and systems described herein address reducing processing times in response to a cache miss in a last-level cache (LLC). To reduce these processing times, a processor generates one or more prefetch requests identifying data, operations, or both, likely to be used in applications executed by the processor, likely to cause a cache miss in the LLC, or both. For prefetch requests likely to cause a cache miss in the LLC, the processor bypasses checking the LLC for data, issuing the prefetch requests speculatively. That is to say, the processor issues one or more speculative prefetch requests. The processor issues these speculative prefetch requests to a memory-side cache controller configured to retrieve the identified data and operations from a memory and store the retrieved data and operations as prefetch fills in a memory-side cache in a data fabric configured to store data. In this way, the processing times in response to a cache miss at an LLC can be reduced as data, instructions, or both can be retrieved from the memory-side cache in the data fabric rather than a memory in response to the cache miss.

To prevent the prefetch fills from filling the memory-side cache in the data fabric and forcing the eviction of one or more prefetch fills from the memory-side cache in the data fabric, the processor selectively issues the speculative prefetch requests for the LLC. To selectively issue the speculative prefetch requests, the processor determines prefetch analytics for the generated speculative prefetch requests and compares the determined prefetch analytics of the speculative prefetch requests to selection thresholds. In response to a speculative prefetch request meeting or exceeding a selection threshold, the processor selects the speculative prefetch request for issuance to the cache controller. Additionally, the processor is configured to issue the selected speculative prefetch requests when one or more condition thresholds are met. That is to say, in response to a current system status, either meeting or exceeding a condition threshold, the processor issues the selected speculative prefetch requests. By issuing the speculative prefetch requests once the selection and condition thresholds are met, the likelihood that the memory-side cache in the data fabric will be filled by prefetch fills is reduced. As such, the cache miss rate of the system can be reduced as fewer prefetches are evicted from the memory-side cache in the data fabric in response to the memory-side cache in the data fabric being full.

Figure 1:
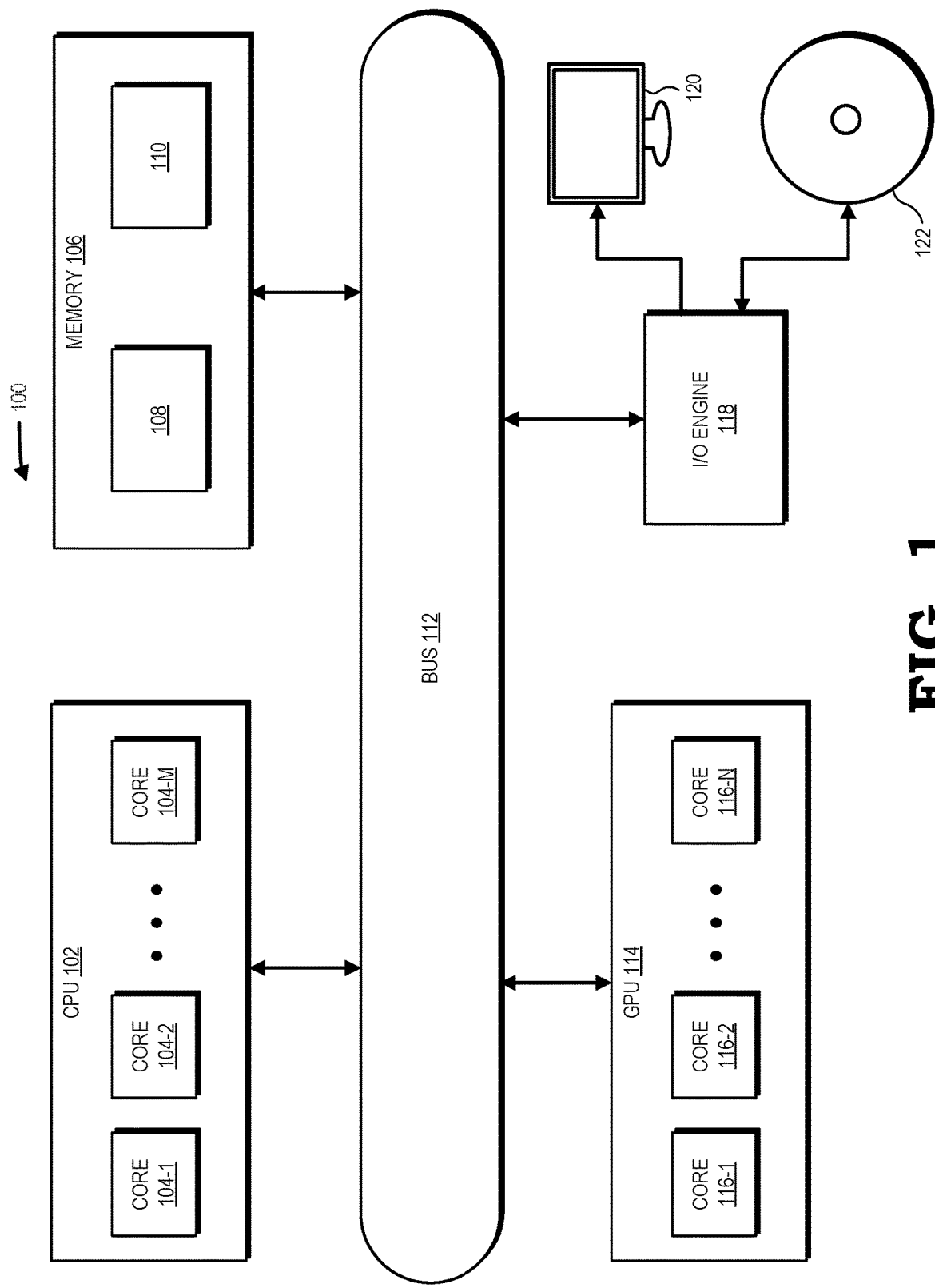
FIG. 1 is a block diagram of a processing system configured to selectively issue speculative prefetch requests for a last-level cache, in accordance with some implementations.

FIG. 1 is a block diagram of a processing system 100 for selectively issuing speculative prefetch requests for a last-level cache, according to some implementations. The processing system 100 includes or has access to a memory 106 or other storage component implemented using a non-transitory computer-readable medium, for example, a dynamic random-access memory (DRAM). However, in implementations, the memory 106 is implemented using other types of memory including, for example, static random-access memory (SRAM), nonvolatile RAM, and the like. According to implementations, the memory 106 includes an external memory implemented external to the processing units implemented in the processing system 100. The processing system 100 also includes a bus 112 to support communication between entities implemented in the processing system 100, such as the memory 106. Some implementations of the processing system 100 include other buses, bridges, switches, routers, and the like, which are not shown in FIG. 1 in the interest of clarity.

The techniques described herein are, in different implementations, employed at any of a variety of parallel processors (e.g., vector processors, graphics processing units (GPUs), general-purpose GPUs (GPGPUs), non-scalar processors, highly parallel processors, artificial intelligence (AI) processors, inference engines, machine learning processors, other multithreaded processing units, and the like), scalar processors, serial processors, or any combination thereof. FIG. 1 illustrates an example of a parallel processor and in particular a graphics processing unit (GPU) 114, in accordance with some implementations. The GPU 114 renders images for presentation on a display 120. For example, the GPU 114 renders objects to produce values of pixels that are provided to the display 120, which uses the pixel values to display an image that represents the rendered objects. The GPU 114 implements a plurality of processor cores 116-1 to 116-N that execute instructions concurrently or in parallel. According to implementations, one or more processor cores 116 operate as SIMD units that perform the same operation on different data sets. Though in the example implementation illustrated in FIG. 1, three cores (116-1, 116-2, 116-N) are presented representing an N number of cores, the number of processor cores 116 implemented in the GPU 114 is a matter of design choice. As such, in other implementations, the GPU 114 can include any number of cores 116. Some implementations of the GPU 114 are used for general-purpose computing. The GPU 114 executes instructions such as program code 108 stored in the memory 106 and the GPU 114 stores information in the memory 106 such as the results of the executed instructions.

The processing system 100 also includes a central processing unit (CPU) 102 that is connected to the bus 112 and therefore communicates with the GPU 114 and the memory 106 via the bus 112. The CPU 102 implements a plurality of processor cores 104-1 to 104-N that execute instructions concurrently or in parallel. In implementations, one or more of the processor cores 104 operate as SIMD units that perform the same operation on different data sets. Though in the example implementation illustrated in FIG. 1, three cores (104-1, 104-2, 104-M) are presented representing an M number of cores, the number of processor cores 104 implemented in the CPU 102 is a matter of design choice. As such, in other implementations, the CPU 102 can include any number of cores 104. In some implementations, the CPU 102 and GPU 114 have an equal number of cores 104, 116 while in other implementations, the CPU 102 and GPU 114 have a different number of cores 104, 116. The processor cores 104 execute instructions such as program code 110 stored in the memory 106 and the CPU 102 stores information in the memory 106 such as the results of the executed instructions. The CPU 102 is also able to initiate graphics processing by issuing draw calls to the GPU 114. In implementations, the CPU 102 implements multiple processor cores (not shown in FIG. 1 in the interest of clarity) that execute instructions concurrently or in parallel.

An input/output (I/O) engine 118 includes hardware and software to handle input or output operations associated with the display 120, as well as other elements of the processing system 100 such as keyboards, mice, printers, external disks, and the like. The I/O engine 118 is coupled to the bus 112 so that the I/O engine 118 communicates with the memory 106, the GPU 114, or the CPU 102. In the illustrated implementation, the I/O engine 118 reads information stored on an external storage component 122, which is implemented using a non-transitory computer-readable medium such as a compact disk (CD), a digital video disc (DVD), and the like. The I/O engine 118 is also able to write information to the external storage component 122, such as the results of processing by the GPU 114 or the CPU 102.

In implementations, the GPU 114, CPU 102, or both, include or are otherwise coupled to one or more caches arranged in a cache hierarchy. For example, GPU 114 includes or is otherwise coupled to caches L0, L1, L2, and L3 arranged in a cache hierarchy with L0 being the highest-level cache and L3 being the LLC. In implementations, one or more LLCs coupled to or otherwise included in GPU 114, CPU 102, or both, are connected to one or more data fabrics that each includes an interconnect architecture to facilitate data and control transmission across one or more components coupled together via the data fabric. According to implementations, the data fabric includes a memory-side cache configured to store data that is requestable by the GPU 114, CPU 102, or both. For example, in response to a cache miss in the LLC, the data that caused the cache miss in the LLC may be requested from the memory-side cache in the data fabric. The GPU 114, CPU 102, or both, are configured to determine and issue one or more prefetch requests for one or more LLCs. The prefetch requests each include a request for data, instructions, or both that are likely to be used in an operation or application running on the GPU 114, CPU 102, or both. For example, GPU 114, CPU 102, or both determine data, instructions, or both that are likely to be used in an operation or application by determining one or more access patterns of the data, instructions, or both for the operation or application. In implementations, the GPU 114, CPU 102, or both are configured to determine and issue one or more prefetch requests speculatively (e.g., based on a cache miss history). That is to say, GPU 114, CPU 102, or both are configured to determine and issue one or more speculative prefetch requests for one or more LLCs that each include a request for data, instructions, or both that are likely to be used in an operation or application running on the GPU 114, CPU 102, or both, likely to cause a cache miss in the LLC, or both. Such data includes, for example, data or instructions historically causing cache misses in one or more caches, data or instructions represented in low confidence prefetch requests from higher-level caches (e.g., L0, L1, L2), data or instructions associated with one or more cache misses (e.g., data or instructions in a next sequential line in relation to the data or instructions that caused a cache miss), or any combination thereof. In implementations, the GPU 114, CPU 102, or both can issue one or more speculative prefetch requests to a cache controller (not shown for clarity) configured to retrieve the data or instructions indicated in the speculative prefetch requests from memory 106. In response to retrieving the data or instructions from memory 106, the cache controller is configured to store the retrieved data or instructions in the memory-side cache in the data fabric. In issuing speculative prefetch requests, the latency for prefetch requests (e.g., the time to fetch the data, instructions, or both indicated in the speculative prefetch requests) is reduced as the cache controller requests the data, instructions, or both from the memory 106 before checking if the data, instructions, or both indicated in the speculative prefetch requests is already in the cache.

To help prevent the speculative prefetch requests issued by GPU 114, CPU 102, or both filling up all the available space in the memory-side cache in the data fabric, GPU114, CPU 102, or both are configured to issue the speculative prefetch requests selectively. That is to say, GPU 114, CPU 102, or both are configured to issue speculative prefetch requests when one or more predetermined condition thresholds, selection thresholds, or both are met. Such predetermined selection thresholds include, for example, predetermined data types indicated by a speculative prefetch request (e.g., instructions, code), predetermined confidences of a speculative prefetch request, predetermined access types of a speculative prefetch request (hardware prefetch, software prefetch), or any combination thereof, to name a few. According to implementations, in response to determining one or more speculative prefetch requests, GPU 114, CPU 102, or both are configured to determine one or more prefetch analytics of the speculative prefetch requests. These analytics includes, for example, one or more data types, confidences, access types, or any combination of the speculative prefetch requests. In response to determining one or more prefetch analytics, GPU 114, CPU 102, or both compare the determined prefetch analytics to one or more predetermined selection thresholds. For example, GPU 114, CPU 102, or both are configured to compare one or more values, tables, vectors, strings, or any combination thereof representing one or more determined data types, confidences, access types, or any combination thereof, of the speculative prefetch requests to one or more values, tables, vectors, strings, or any combination thereof, representing the determined selection thresholds. In response to the comparison indicating that one or more of the predetermined selection thresholds are met (e.g., one or more values representing a predetermined selection threshold are met or exceeded), GPU 114, CPU 102, or both are configured to select the speculative prefetch requests meeting or exceeding the predetermined selection thresholds for issuance. The predetermined condition thresholds include, for example, one or more predetermined hardware conditions (e.g., power states of one or more processing cores, operating modes of one or more processing cores), one or more predetermined queue statuses (e.g., a queue reporting as full, a queue reporting availability), one or more predetermined initiator statuses (e.g., the priority of an initiator issuing a speculative prefetch), or any combination thereof. In implementations, in response to determining one or more speculative prefetch requests, GPU 114, CPU 102, or both are configured to determine one or more current system statuses, for example, one or more queue statuses, hardware conditions, initiator statuses, or any combination thereof within system 100 and compare the determined queue statuses, hardware conditions, and initiator statuses to one or more predetermined condition thresholds. For example, GPU 114, CPU 102, or both are configured to compare one or more values, tables, vectors, strings, or any combination thereof representing one or more determined queue statuses, hardware conditions, initiator statuses, or any combination thereof within system 100 to one or more values, tables, vectors, strings, or any combination thereof representing one or more predetermined condition thresholds. In response to the comparison indicating that one or more of the predetermined condition thresholds are met (e.g., one or more values representing the predetermined condition thresholds are met or exceeded), GPU 114, CPU 102, or both are configured to issue the selected speculative prefetch requests. In this way, speculative prefetch requests are selectively issued by GPU 114, CPU 102, or both, reducing the likelihood that the memory-side cache in the data fabric will be full. As such, the cache miss rate of the system can be reduced as fewer prefetches are evicted from the memory-side cache in the data fabric in response to it being full.

Figure 2:
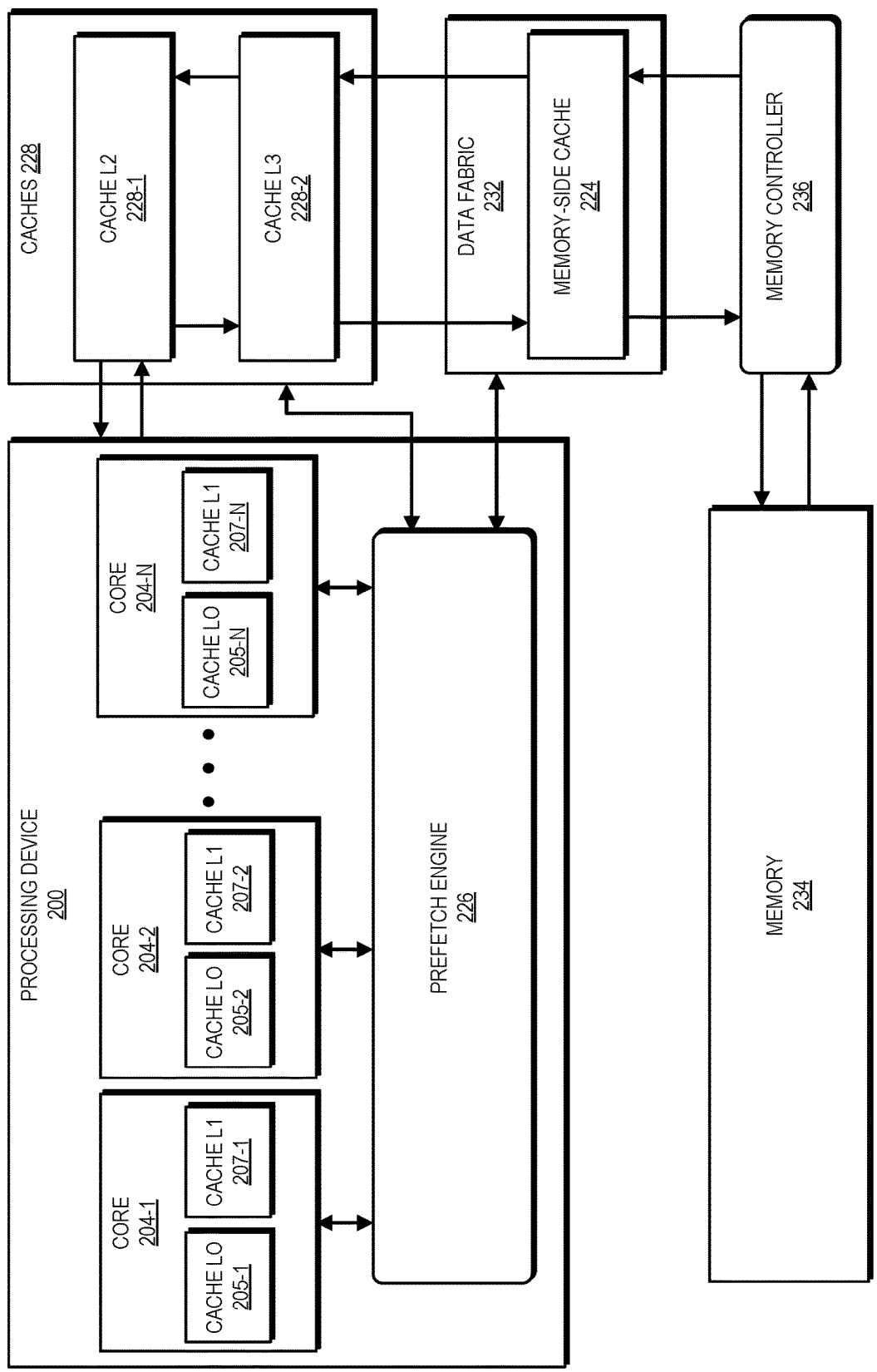
FIG. 2 is a block diagram of a processing device configured to selectively issue speculative prefetch requests for a last-level cache, in accordance with some implementations.

Referring now to FIG. 2, a processing device 200 configured to issue one or more selective speculative prefetch requests for an LLC is presented. In implementations, the processing device 200 implements aspects of processing system 100 as described in FIG. 1. For example, processing device 200 may be similar or the same as CPU 102, GPU 114, or both as described in FIG. 1. Processing device 200 includes processing cores 204, similar to or the same as cores 104, 116 configured to execute instructions concurrently or in parallel for one or more applications or operations. Though FIG. 2 illustrates an example implementation presenting three processing cores (204-1, 204-2, 204-N) representing an N number of processing cores, in other implementations, processing device 200 can include any number of processing cores 204. Each processor core includes or is otherwise connected to one or more respective private caches, for example, L0 205 and L1 207. Though the example implementation illustrated in FIG. 2 presents each processing core (204-1, 204-2, 204-N) having two private caches (L0 205-1, 205-2, 205-N and L1 207-1, 207-2, 207-N, respectively), in other implementations, each processing core can include or otherwise be connected to any number of private caches. Further, processing device 200 includes or is otherwise connected to one or more shared caches 228. Though the example implementation illustrated in FIG. 2 presents processing device 200 including or otherwise connected to two shared caches (L2 228-1, L3 228-2), in other implementations, processing device 200 can include or otherwise be connected to any number of shared caches 228. To facilitate the execution of the instructions on the processing cores 204, for each processing core 204, the caches included in or otherwise connected to a processing core 204 (e.g., cache L0 205, cache L1 207) and the caches included in or otherwise connected to processing device 200 (e.g., cache L2 228-1, cache L3 228-2) are arranged in a cache hierarchy having a number of cache levels, for example, L0-L3. As an example, for processing core 204-1, a cache hierarchy includes cache L0 205-1 at a first, or top, cache level, cache L1 207-1 at a second cache level, cache L2 228-1 at a third cache level, and cache L3 228-2 at a fourth, or last, cache level. Caches 205, 207, and 228 are each configured to store data and instructions used by processing cores 204 for one or more operations or applications. To manage caches 205, 207, and 228, each cache includes a cache controller that includes hardware and software configured to manage the data and instructions stored in its respective cache 205, 207, and 228. For example, a cache controller includes hardware and software configured to fetch, read, write, map, insert, update, invalidate, evict, flush, clean, or any combination thereof, data and instructions stored in caches 205, 207, and 228. To execute one or more operations, applications, or both, each processing core 204 can request data or instructions necessary for, aiding in, or helpful for the operations and applications to be executed at the processing core 204 from the cache controller of one or more caches 205, 207, 228 within a cache hierarchy. In implementations, each processing core 204 can request data or instructions necessary for, aiding in, or helpful for the operations and applications to be executed at the processing core 204 from the cache controller of a top-level cache associated with the processing core 204. For example, processing core 204-1 requests data or instructions necessary for, aiding in, or helpful for the operations and applications to be executed on processing core 204-1 from the cache controller of cache L0 205-1. In response to receiving a request, a cache controller of a cache 205, 207, 228 checks its respective cache 205, 207, 228 for the requested data or instructions. According to implementations, in response to the requested data, instructions, or both not being in a cache, the cache controller of the cache forwards the request to the cache controller of the next sequential cache in the cache hierarchy 228. For example, a cache controller of a highest-level cache (e.g., L0 205) in a cache hierarchy checks the highest-level cache (e.g., cache L0 205) and, in response to the requested data, instructions, or both not being present in the highest-level cache (i.e., a cache miss), provides the request to the cache controller of the next-level cache (e.g., L1 207). In response to a cache miss at the LLC (e.g., L3 230-4), the cache controller of the LLC retrieves the requested data and instructions from memory 234, similar to or the same as memory 106. For example, in response to the data not being present in the LLC, the cache controller of the LLC forwards the request to a memory controller 236 including hardware and software configured to retrieve the requested data and instructions from memory 234.

Processing device 200 is coupled to memory 234 by data fabric 232 that includes an interconnect architecture to facilitate data and control transmission between processing device 200 and memory 234. For example, data fabric 232 facilitates the control and transmission of requests for data and instructions from memory controller 236 of processing device 200 to memory 234. In implementations, data fabric 232 includes memory-side cache 224 configured to store one or more instructions or data for one or more operations or applications to be run on one or more processing cores 104. In response to a cache miss at the LLC (e.g., L3 228-2), the cache controller of the LLC is configured to check memory-side cache 224 in the data fabric 232 for the data and instructions that caused a cache miss at the LLC. In response to the requested data and instructions not being present in the memory-side cache 224, a cache controller of the memory-side cache (not shown for clarity) forwards the request to memory controller 236 to retrieve the request data and instructions from memory 234.

According to implementations, one or more processing cores 204 are configured to generate and issue one or more speculative prefetch requests. For example, each processing core 204 includes or is otherwise coupled to a prefetch engine 226 that includes hardware and software configured to generate one or more speculative prefetch requests. Each speculative prefetch request generated by prefetch engine 226 indicates a request for data, instructions, or both that is likely to be used in an operation or application executing or to be executed on a processing core 204, likely to cause a cache miss in one or more caches 230, or both. For example, a speculative prefetch request includes a request for data, instructions, or both that have previously caused one or more cache misses, data, instructions, or both having higher execution times, data, instructions, or both sequentially next in an application or operation running on a processing core 204, or any combination thereof, to name a few. Prefetch engine 226 provides one or more generated speculative prefetch requests to one or more cache controllers of one or more caches 205, 207, 224, 228. In response to receiving one or more speculative prefetch requests, a cache controller is configured to send one or more requests for the data and instructions identified in the speculative prefetch requests to memory controller 236 which retrieves the data and instructions identified in the speculative prefetch requests from memory 234. The cache controller then fills one or more respective caches 205, 207, 224, 228 with the data and instructions retrieved from memory 234. In other words, the cache controller stores one or more prefetch fills (i.e., data retrieved from memory 234) in one or more respective caches 205, 207, 224, 228.

In implementations, prefetch engine 226 is configured to determine one or more speculative prefetch requests for an LLC (e.g., L3 228-2). That is to say, prefetch engine 226 determines one or more speculative prefetch requests that indicate data, instructions, or both that are likely to cause a cache miss in the LLC. Such data, instructions, or both include, for example, data, instructions, or both indicated in speculative prefetch requests issued for higher-level caches (e.g., L0 205, L1 207, L2 228-1). As another example, such data, instructions, or both include data, instructions, or both historically causing cache misses in the LLC. In response to determining one or more speculative prefetch requests for the LLC, prefetch engine 226 is configured to provide one or more of the speculative prefetch requests for the LLC to the cache controller of memory-side cache 224. In response to receiving one or more speculative prefetch requests for the LLC, the cache controller of memory-side cache 224 retrieves the data, instructions, or both indicated in the speculative prefetch requests for the LLC from memory 234 and stores the retrieved data, instructions, or both (i.e., prefetch fills) in the memory-side cache 224. In this way, the processing time in response to a cache miss at the LLC can be reduced as data can be retrieved from the memory-side cache 224 in the data fabric 232 rather than memory 234 in response to the cache miss. Processing times are reduced as retrieving the data, instructions, or both that caused a cache miss in the LLC from the prefetch fills in the memory-side cache 224 in the data fabric 232 has a shorter processing time than retrieving the data, instructions, or both that caused a cache miss in the LLC from memory 234.

To prevent the speculative prefetch requests generated by prefetch engine 226 from filling the memory-side cache and forcing the eviction of one or more prefetch fills from the memory-side cache, prefetch engine 226 is configured to selectively issue one or more speculative prefetch requests to the cache controller of memory-side cache 224. That is to say, prefetch engine 226 is configured to select one or more speculative prefetch requests to issue to the cache controller of memory-side cache 224. According to implementations, prefetch engine 226 selects one or more speculative prefetch requests to issue when one or more predetermined selection thresholds are met. Predetermined selection thresholds include, for example, predetermined data types indicated by a speculative prefetch request (e.g., instructions, code), predetermined confidences of a speculative prefetch request, predetermined access types of a speculative prefetch request (e.g., hardware prefetch, software prefetch), or any combination thereof, to name a few. In response to generating one or more speculative prefetch requests, prefetch engine 226 is configured to determine one or more prefetch analytics for one or more of the speculative prefetch requests, for example, data types indicated by the speculative prefetch requests, confidences of the speculative prefetch requests, access types of the speculative prefetch requests, or any combination thereof. As an example, in response to generating one or more speculative prefetch requests, prefetch engine 226 determines an access type of a speculative prefetch request of a hardware prefetch access. In implementations, prefetch engine 226 compares one or more of the determined prefetch analytics to one or more of the predetermined selection thresholds. For example, prefetch engine 226 compares values, tables, vectors, strings, or any combination thereof representing the determined prefetch analytics to one or more values, tables, vectors, strings, or any combination thereof representing the predetermined selection thresholds. In response to the comparison indicating a determined prefetch analytic of a speculative prefetch request meets or exceeds one or more predetermined selection thresholds, the prefetch engine 226 selects the speculative prefetch request for issuance.

In implementations, prefetch engine 226 is configured to issue one or more selected speculative prefetch requests in response to one or more predetermined condition thresholds being met or exceeded. Such predetermined condition thresholds include, for example, one or more predetermined hardware conditions (e.g., power states of one or more processing cores, predetermined operating modes of one or more processing cores), one or more predetermined queue statues (e.g., a queue reporting as full, a queue reporting availability), one or more predetermined initiator status (e.g., the priority of an initiator issued a speculative prefetch), or any combination thereof. In response to generating one or more speculative prefetch requests, prefetch engine 226 determines one or more current system conditions of system 100 that include, for example, current hardware conditions of system 100, the current status (e.g., priority) of one or more processing cores 204 (i.e., initiators) issuing a speculative prefetch request, one or more statues of queues associated with the LLC (e.g., an LLC fill buffer), or any combination thereof. In implementations, prefetch engine 226 compares the determined current system conditions to one or more predetermined condition thresholds. For example, prefetch engine 226 compares values, tables, vectors, strings, or any combination thereof representing the determined current system conditions to one or more values, tables, vectors, strings, or any combination thereof representing the predetermined condition thresholds. In response to the comparison indicating one or more of the predetermined conditions have been met (e.g., one or more of the values representing the determined current conditions meet or exceed the values representing a predetermined condition threshold), the prefetch engine 226 issues one or more of the selected speculative prefetch requests to the cache controller of memory-side cache 224. In this way, speculative prefetch requests are selectively issued by prefetch engine 226 to the cache controller of memory-side cache 224 which reduces the likelihood that the memory-side cache 224 in the data fabric 232 will be filled causing prefetch fills to be evicted from the memory-side cache 224. As such, having fewer prefetched fills evicted from the memory-side cache 224 helps reduce the cache miss rate for the LLC (e.g., L3 228-2).

Figure 3:
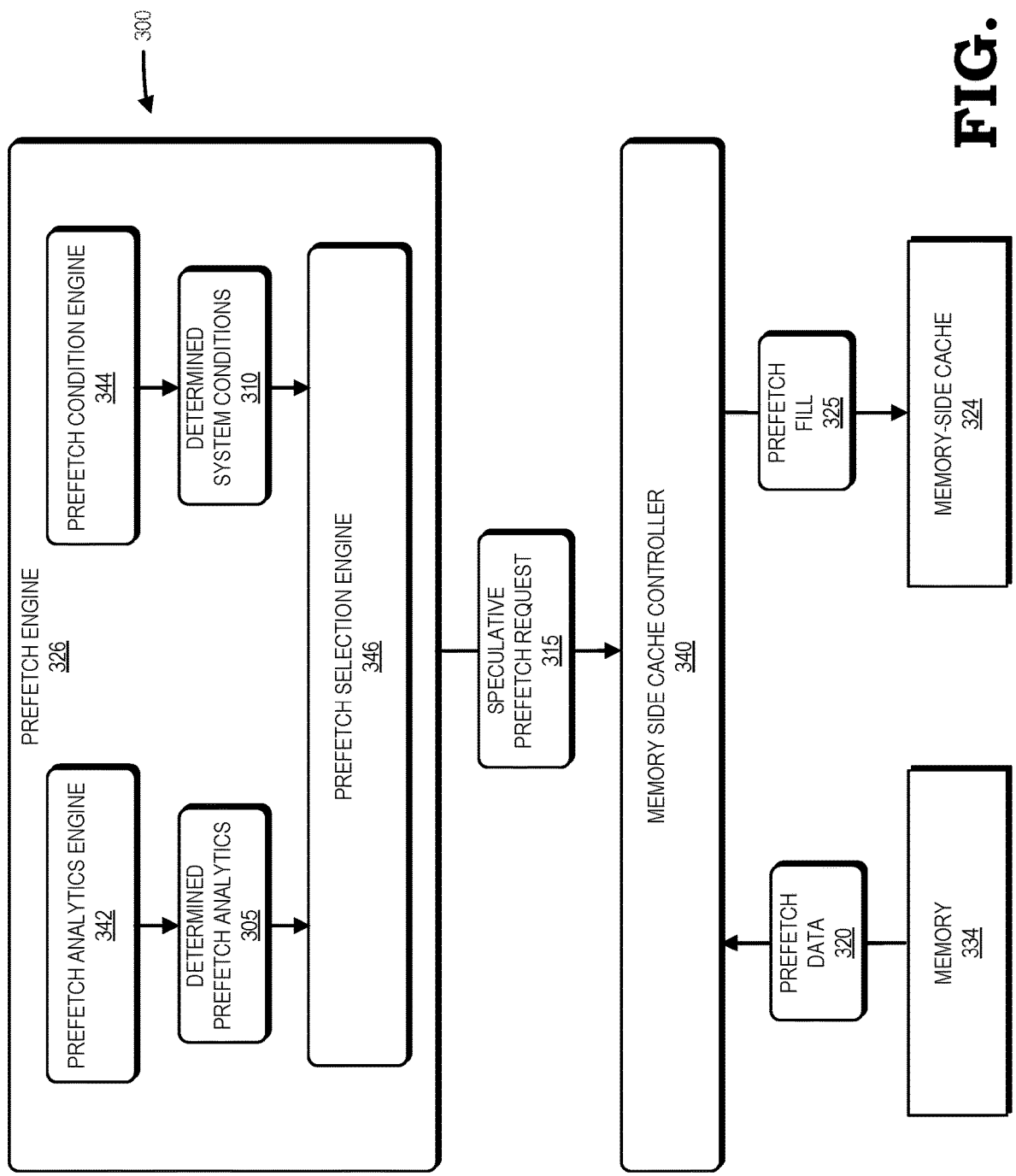
FIG. 3 is a signal flow diagram for selectively issuing speculative prefetch requests to prefill a memory-side cache in a data fabric, in accordance with some implementations.

Referring now to FIG. 3, a signal flow diagram for a selective speculative prefetch issue operation 300 is presented. The operation 300 includes a prefetch engine 326, similar to or the same as prefetch engine 226, configured to issue one or more speculative prefetch requests 315. The prefetch engine 326 includes a prefetch selection engine 346 that includes hardware and software configured to select one or more speculative prefetch requests 315 for an LLC to issue to memory-side cache controller 340 that includes hardware and software configured to manage the data and instructions written to and stored in memory-side cache 324, similar to or the same as memory-side cache 234. In implementations, prefetch selection engine 346 selects one or more speculative prefetch requests 315 to issue to memory-side cache controller 340 based on one or more predetermined condition thresholds and one or more predetermined selection thresholds. For example, prefetch selection engine 346 selects and issues a speculative prefetch request 315 to memory-side cache controller 340 in response to the speculative prefetch request meeting one or more predetermined selection thresholds and one or more predetermined condition thresholds being met.

To facilitate the selection of speculative prefetch requests, prefetch engine 326 includes prefetch analytic engine 342 that includes hardware and software configured to determine one or more prefetch analytics 305 of one or more speculative prefetch requests. In response to prefetch engine 326 generating one or more speculative prefetch requests, prefetch analytic engine 342 is configured to determine one or more prefetch analytics 305 for one or more of the generated speculative prefetch requests. For example, prefetch analytic engine 342 determines data types indicated by one or more of the speculative prefetch requests (e.g., instructions, code), confidences of one or more of the speculative prefetch requests, access types of one or more of the speculative prefetch request (hardware prefetch, software prefetch), or any combination thereof, to name a few. Prefetch analytic engine 342 determines one or more prefetch analytics 305 of a speculative prefetch request by, for example, comparing the speculative prefetch request to one or more values, strings, tables, or any combination thereof, providing the speculative prefetch request to a lookup table configured to identify one or more prefetch analytics or both. In response to determining one or more prefetch analytics 305, prefetch analytics engine 342 provides the determined prefetch analytics 305 to prefetch selection engine 346. Prefetch engine 326 further includes prefetch condition engine 344 that includes hardware and software configured to determine one or more current system conditions 310 of system 100. In response to prefetch engine 326 generating one or more speculative prefetch requests for an LLC, prefetch condition engine 344 is configured to determine one or more current system conditions 310 of system 100. For example, in response to prefetch engine 326 generating one or more speculative prefetch requests for an LLC, prefetch condition engine 344 determines one or more hardware conditions of the processing cores issuing the speculative prefetch requests (e.g., power states, operating modes), one or more statuses (e.g., reporting full, reporting availability) of queues associated with the LLC (e.g., a miss queue configured to track outstanding LLC misses), one or more initiator status (e.g., a priority of an initiator issuing a speculative prefetch), or any combination thereof. Prefetch engine 326 determines one or more current system conditions 310 by, for example, comparing identification information (e.g., CPUID information, APICID) associated with a processing core, queue, or memory to one or more values, tables, strings, or any combination thereof, providing identification information associated with a processing core, queue, or memory to one or more lookup tables configured to identify a current system condition or both. In response to determining one or more current system conditions 310, prefetch condition engine 344 provides the determined current system conditions 310 to prefetch selection engine 346.

According to implementations, in response to one or more predetermined condition thresholds being met, one or more selection thresholds being met, or both, prefetch selection engine 346 selects one or more speculative prefetch requests 315 to issue to memory-side cache controller 340. For example, in response to a miss queue related to the LLC being full and a speculative prefetch request meeting an access type threshold, prefetch selection engine 346 selects the speculative prefetch request meeting an access type threshold to issue to memory-side cache controller 340. In response to receiving one or more speculative prefetch requests 315, memory-side cache controller 340 requests the data, instructions, or both indicated in the speculative prefetch requests 315 (i.e., prefetch data 320) from memory 334, similar to or the same as memory 106, 234. For example, in response to receiving one or more speculative prefetch requests 315, the memory-side cache controller 340 forwards a request for the data, instructions, or both indicated in the speculative prefetch requests 315 (i.e., prefetch data 320) to a memory controller, similar to or the same as memory controller 236, configured to retrieve the data from memory 334 and provide the prefetch data 320 to memory-side cache controller 340. In response to receiving the prefetch data 320, memory-side cache controller 340 stores the prefetch data 320 in a memory-side cache 324, similar to or the same as memory-side cache 224 in data fabric 232, as one or more prefetch fills 325. That is to say, memory-side cache controller 340 stores one or more prefetch fills 325 representing the data retrieved from memory 334 (i.e., prefetch data 320) in memory-side cache 324.

Figure 4:
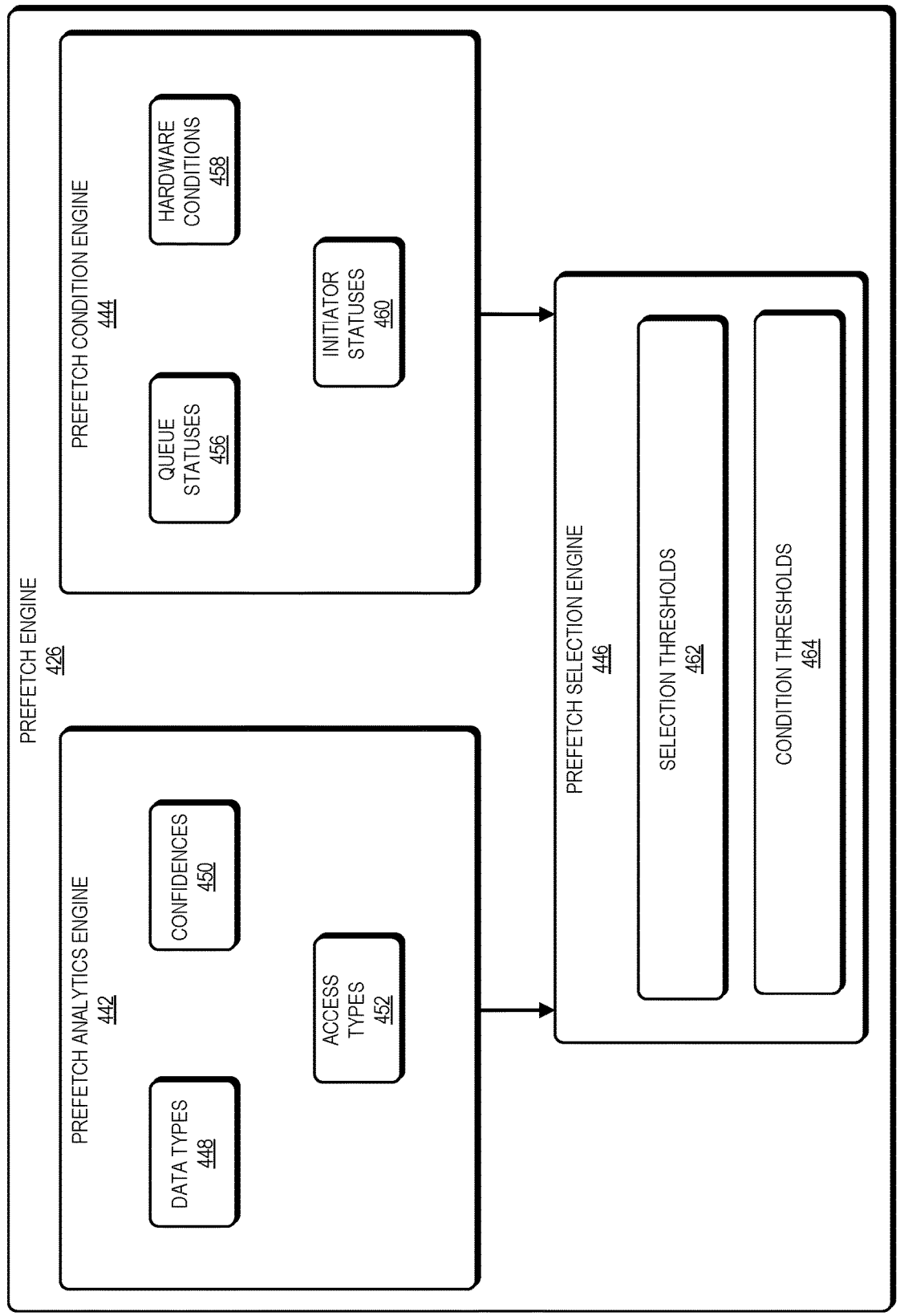
FIG. 4 is a block diagram of a prefetch engine configured to selectively issue speculative prefetch requests based on selection and condition thresholds, in accordance with some implementations.

Referring now to FIG. 4, a prefetch engine 426 configured to selectively issue one or more speculative prefetch requests for an LLC is presented. In implementations, prefetch engine 426, similar to or the same as prefetch engine 226, 326, generates one or more speculative prefetch requests for an LLC. For example, prefetch engine 426 downgrades one or more prefetch requests for one or more higher-level caches. Downgrading includes, for example, designating a prefetch request generated for or otherwise associated with a first cache to a second, lower-level cache. As an example, prefetch engine 426 designates a prefetch generated for or otherwise associated with an L1 cache to the LLC such that the prefetch is issued for LLC. In implementations, prefetch engine 426 downgrades one or more prefetch requests based on the confidence of the prefetch request. For example, in response to a prefetch request having a confidence below a threshold value, prefetch engine 426 is configured to downgrade the prefetch request. In response to generating one or more speculative prefetch requests, prefetch engine 426 is configured to determine one or more prefetch analytics of the speculative prefetch requests. According to implementations, prefetch engine 426 includes prefetch analytics engine 442, similar to or the same as prefetch analytics engine 342, configured to determine one or more data types 448, confidences 450, access types 452, or any combination thereof of the generated speculative prefetch requests. In implementations, prefetch analytics engine 442 determines one or more data types 448 indicated by one or more of the speculative prefetch requests. For example, prefetch analytics engine 442 determines one or more data types 448 (e.g., code, instructions, addresses, variables) identified (e.g., requested) by one or more speculative prefetch requests. To determine one or more data types 448 of one or more speculative prefetch requests, prefetch analytics engine compares one or more values, tables, vectors, strings, or any combination thereof representing one or more speculative prefetch requests to one or more values, tables, vectors, strings, or any combination thereof representing one or more data types 448, identifying one or more flags of one or more speculative prefetch requests, providing the speculative prefetch requests to lookup tables configured to identify one or more data types, or any combination thereof. According to implementations, prefetch analytics engine 442 determines one or more confidences 450 for one or more of the speculative prefetch requests. For example, prefetch analytics engine 442 determines one or more confidences 450 each indicating a likelihood the data requested by a respective speculative prefetch request will be needed by one or more applications or operations running on one or more processing cores. To determine one or more confidences 450 of one or more speculative prefetch requests, prefetch analytics engine compares one or more values, tables, vectors, strings, or any combination thereof representing one or more speculative prefetch requests to one or more values, tables, vectors, strings, or any combination thereof representing one or more confidences 450, providing the speculative prefetch requests to lookup tables configured to identify one or more confidences or both. In implementations, prefetch analytics engine 442 determines one or more access types 452 indicated by one or more of the speculative prefetch requests. For example, prefetch analytics engine 442 determines one or more access types 452 (e.g., hardware prefetch, software prefetch) indicated by one or more speculative prefetch requests. To determine one or more access types 452 of one or more speculative prefetch requests, prefetch analytics engine compares one or more values, tables, vectors, strings, or any combination thereof representing one or more speculative prefetch requests to one or more values, tables, vectors, strings, or any combination thereof representing one or more access types 452, identifying one or more flags of one or more speculative prefetch requests, providing the speculative prefetch requests to lookup tables configured to identify one or more access types 452, or any combination thereof. In response to determining one or more data types 448, confidences 450, access types 452, or any combination thereof, prefetch analytics engine 442 provides the data types 448, confidences 450, and access types 452 to prefetch selection engine 446 similar to or the same as prefetch selection engine 346.

In response to receiving one or more data types 448, confidences 450, access types 452, or any combination thereof, prefetch selection engine 446 is configured to determine if one or more of the received data types 448, confidences 450, and access types 452 meets or exceeds one or more selection thresholds 462. That is to say, whether one or more of the speculative prefetch requests meet or exceed one or more selection thresholds 462. Selection thresholds 462 include data representing one or more predetermined threshold values for data types 448, confidences 450, access types 452, or any combination thereof. For example, selection thresholds 462 include data representing one or more predetermined data types. As another example, selection thresholds 462 include data representing one or more predetermined confidence levels. As yet another example, selection thresholds 462 include data representing one or more predetermined access types. In implementations, prefetch selection engine 446 determines whether one or more speculative prefetch requests meet or exceed the selection thresholds 462 by comparing one or more data types 448, confidences 450, access types 452, or any combination thereof to one or more selections thresholds 462. For example, prefetch selection engine 446 normalizes one or more data types 448, confidences 450, access types 452, or any combination thereof and compares the normalized data types 448, confidences 450, access types 452, or any combination thereof to one or more selection thresholds 462. As another example, one or more values, tables, vectors, strings, or any combination thereof representing one or more data types 448, confidences 450, access types 452, or any combination thereof are compared to selection thresholds 462. In response to the comparison indicating one or more speculative prefetch requests meet or exceeded one or more selection thresholds 462, prefetch selection engine 46 selects the speculative prefetch requests meeting or exceeding the selection thresholds 462 for issuance to a memory-side cache controller, similar to or the same as memory-side cache controller 340. For example, in response to one or more comparisons indicating a value representing one or more data types 448, confidences 450, access types 452, or any combination thereof of a speculative prefetch request meet or exceed one or more values representing one or more selection thresholds 462, prefetch selection engine 446 selects the speculative prefetch request for issuance to the memory-side cache controller.

According to implementations, in response to generating one or more speculative prefetch requests, prefetch engine 426 is configured to determine one or more current system conditions. In implementations, prefetch engine 426 includes prefetch condition engine 444, similar to or the same as prefetch condition engine 344 configured to determine one or more queue statuses 456, hardware conditions 458, initiator statuses 460, or any combination thereof. According to implementations, prefetch condition engine 444 determines one or more queue statuses 456 (e.g., if a queue is full, if a queue has availability) related to an LLC. For example, prefetch condition engine 444 determines whether one or more queues (e.g., fill buffers, write queues, read queues) related to an LLC are full. As an example, prefetch analytics engine 442 determines that a fill buffer related to the LLC is full. To determine one or more queue statuses 456, prefetch condition engine compares one or more values, tables, vectors, strings, or any combination thereof representing one or more queue statuses 456 to one or more values, tables, vectors, strings, or any combination related to one or more queues associated with an LLC, checks one or more flags associated with one or more queues associated with an LLC, or both. In implementations, prefetch condition engine 444 determines one or more hardware conditions 458. For example, prefetch condition engine 444 determines one or more processing core operating modes, processing core power states, cache power states, or any combination thereof, to name a few. To determine one or more hardware conditions 458, prefetch condition engine compares one or more values, tables, vectors, strings, or any combination thereof representing one or more hardware conditions 458 to one or more values, tables, vectors, strings, or any combination related to one or more processing cores, caches, or both, checks one or more flags associated with one or more processing cores, caches, or both. According to implementations, prefetch condition engine 444 determines one or more initiator statuses 460 of one or more speculative prefetch requests. For example, prefetch condition engine 444 determines one or more priorities of processing cores initiating one or more speculative prefetch requests. To determine one or more initiator statuses 460, prefetch condition engine compares one or more values, tables, vectors, strings, or any combination thereof representing one or more initiator statuses 460 to one or more values, tables, vectors, strings, or any combination related to one or more processing cores initiating speculative prefetch requests, checks one or more flags associated with one or more processing cores initiating speculative prefetch requests, or both. In response to determining one or more queue statuses 456, hardware conditions 458, initiator statuses 460, or any combination thereof, prefetch condition engine 444 provides the queue statuses 456, hardware conditions 458, and initiator statuses 460 to prefetch selection engine 446.

In response to receiving one or more queue statuses 456, hardware conditions 458, initiator statuses 460, or any combination thereof, prefetch selection engine 446 is configured to determine if one or more of the received queue statuses 456, hardware conditions 458, and initiator statuses 460 meet or exceeds one or more condition thresholds 464. That is to say, prefetch selection engine 446 determines whether one or more condition thresholds 464 are met. Condition thresholds 464 include data representing one or more predetermined threshold values for queue statuses 456, hardware conditions 458, initiator statuses 460, or any combination thereof. For example, condition thresholds 464 include data representing one or more predetermined queue statuses (e.g., a fill buffer is full, a write queue has availability). As another example, condition thresholds 464 include data representing one or more predetermined hardware conditions (e.g., a processing core is in a performance mode). As yet another example, condition thresholds 464 include data representing one or more predetermined initiator statuses (e.g., priorities of processing cores). In implementations, prefetch selection engine 446 determines whether one or more condition thresholds 464 are met by comparing one or more queue statuses 456, hardware conditions 458, initiator statuses 460, or any combination thereof to one or more condition thresholds 464. For example, prefetch selection engine 446 normalizes one or more queue statuses 456, hardware conditions 458, initiator statuses 460, or any combination thereof and compares the normalized queue statuses 456, hardware conditions 458, initiator statuses 460, or any combination thereof to one or more condition thresholds 464. As another example, one or more values, tables, vectors, strings, or any combination thereof representing one or more queue statuses 456, hardware conditions 458, initiator statuses 460, or any combination thereof are compared to condition thresholds 464. In response to the comparison indicating one or more condition thresholds 464 are met, prefetch selection engine 446 issues one or more selected speculative prefetch requests (e.g., speculative prefetch requests meeting or exceeding one or more selection thresholds 462) to a memory-side cache controller. For example, in response to one or more comparisons indicating a value representing one or more queue statuses 456, hardware conditions 458, initiator statuses 460, or any combination thereof meet one or more values representing one or more condition thresholds 464, prefetch selection engine 446 issues one or more selected speculative prefetch requests to a memory-side cache controller. As another example, in response to a fill buffer associated with the LLC being full, one or more selected speculative prefetch requests are issued. In some implementations, in response to the comparison indicating one or more condition thresholds 464 are met, prefetch selection engine 446 is configured to select one or more speculative prefetch requests for issuance.

Figure 5:
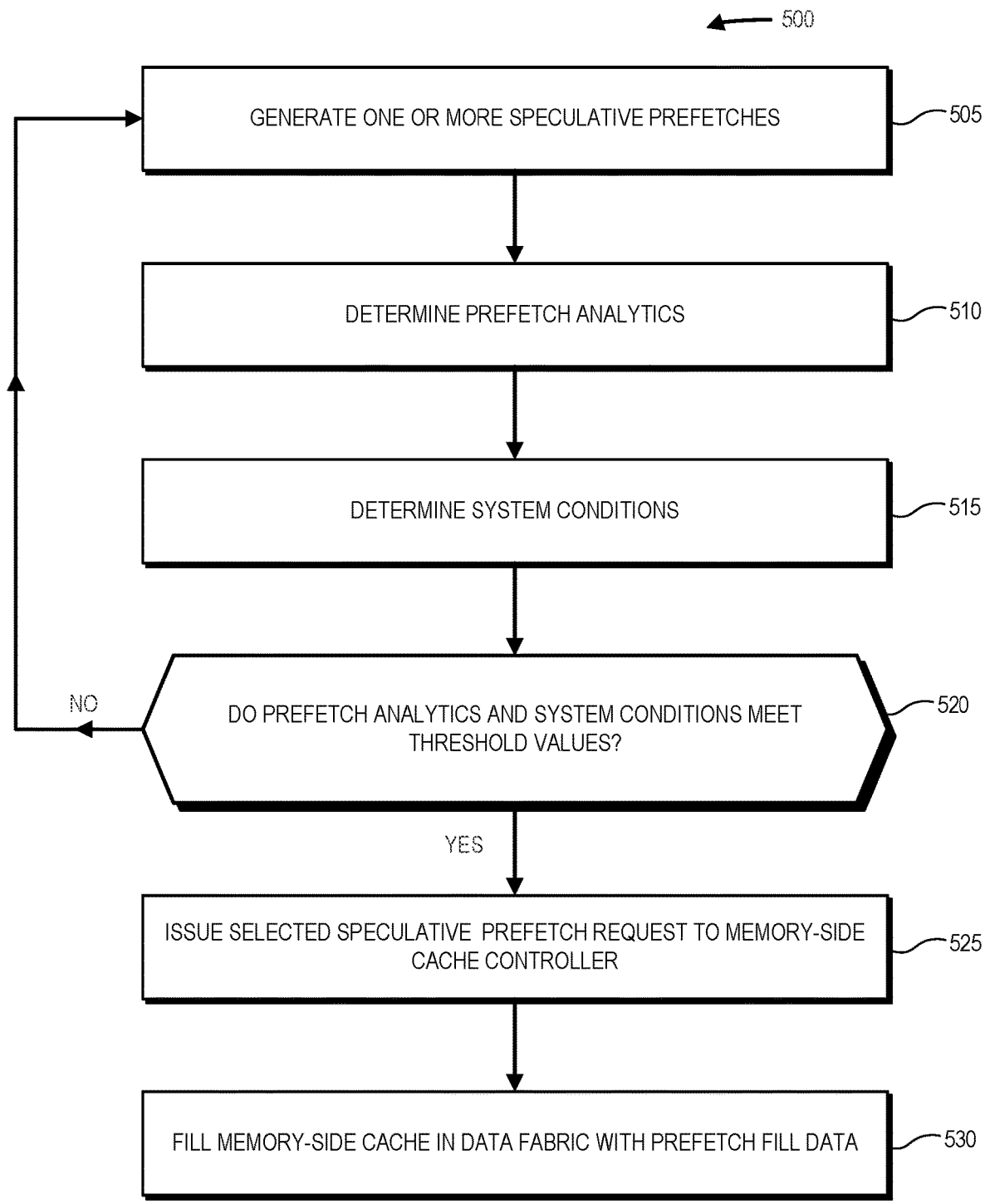
FIG. 5 is a flow diagram illustrating an example method for selectively issuing speculative prefetch requests for a last-level cache, in accordance with some implementations.

Referring now to FIG. 5, an example method 500 for selectively issuing speculative prefetch requests is presented. At step 505, a prefetch engine, similar or the same as prefetch engine 226, 326, 426 generates one or more speculative prefetch requests for an LLC, similar to or the same as L3 230-4. For example, the prefetch engine downgrades one or more speculative prefetch requests issued for one or more higher-level caches, for example, L0 230-1, L1 230-1, or L2 230-3. At step 510, in response to one or more speculative prefetch requests being generated, the prefetch engine determines one or more prefetch analytics of the speculative prefetch requests. For example, the prefetch engine determines one or more data types, confidences, access types, or any combination thereof of the speculative prefetch requests. At step 515, in response to one or more speculative prefetch requests being generated, the prefetch engine determines one or more current system conditions. For example, the prefetch engine determines one or more queue statuses, hardware conditions, initiator statuses 460, or any combination thereof of the system.

At step 520, the prefetch engine determines whether one or more selection thresholds, similar to or the same as selection thresholds 462, condition thresholds, similar to or the same as condition thresholds 464, or both have been met. To determine whether one or more selection thresholds have been met, the prefetch engine compares one or more of the determined prefetch analytics to one or more selection thresholds. That is to say, to determine whether one or more of the speculative prefetch requests meet or exceed the selection thresholds, the prefetch engine compares one or more of the determined prefetch analytics of the speculative prefetch requests to one or more selection thresholds. For example, the prefetch engine compares one or more values, tables, vectors, strings, or any combination thereof, representing one or more determined data types, confidences, access types, or any combination thereof to one or more values, tables, vectors, strings, or any combination thereof representing one or more selection thresholds. In response to the comparison indicating that one or more speculative prefetch requests meet or exceed the selection thresholds, the prefetch engine selects the speculative prefetch requests meeting or exceeding the selection thresholds for issuance to a memory-side cache controller similar to or the same as memory-side cache controller 340. For example, in response to the comparison indicating one or more data types, confidences, access types, or any combination thereof of one or more speculative prefetch requests meet or exceed the selection thresholds, the prefetch engine selects the one or more speculative prefetch requests for issuance to a memory-side cache controller. To determine whether one or more condition thresholds have been met, the prefetch engine compares one or more of the determined current system conditions to one or more condition thresholds. For example, the prefetch engine compares one or more values, tables, vectors, strings, or any combination thereof, representing one or more determined current system conditions to one or more values, tables, vectors, strings, or any combination thereof representing one or more condition thresholds. In response to the comparisons indicating that one or more condition thresholds are met, the system moves to step 525 and the selected speculative prefetch requests are issued to the memory-side cache controller. For example, in response to one or more values representing one or more queue statuses, hardware conditions, initiator statuses, or any combination thereof meeting or exceeding one or more values representing one or more condition thresholds, the selected speculative prefetch requests are issued to the memory-side cache controller. If the prefetch analytics, system conditions, or both do not meet or exceed one or more selection thresholds or condition thresholds, respectively, the system moves back to step 505.

At step 525, the selected speculative prefetch requests are issued to the memory-side cache controller and the memory-side cache controller retrieves the data, instructions, or both indicated in the selected speculative prefetch requests from a memory, similar to or the same as memory 106, 234, 334. For example, the memory-side cache controller forwards one or more selected speculative prefetch requests to a memory controller, similar to or the same as memory controller 236, configured to retrieve the data, instructions, or both indicated in the selected speculative prefetch requests from a memory and provide it to the memory-side cache controller. At step 530, the memory-side cache controller stores the data retrieved from the memory (i.e., prefetch fill data) in at least a portion of a memory-side cache in a data fabric, similar to or the same as memory-side cache 224, 324 in data fabric 232. In this way, the processing times in response to a cache miss at an LLC can be reduced as data, instructions, or both can be retrieved from the memory-side cache in the data fabric rather than memory in response to the cache miss. Additionally, speculative prefetch requests are selectively issued by the prefetch engine, reducing the likelihood that the memory-side cache in the data fabric will be full. As such, the cache miss rate of the system can be reduced as fewer prefetches are evicted from the memory-side cache in the data fabric in response to the memory-side cache in the data fabric being full.

In some implementations, the apparatus and techniques described above are implemented in a system including one or more integrated circuit (IC) devices (also referred to as integrated circuit packages or microchips), such as the prefetch engine described above with reference to FIGS. 1-5. Electronic design automation (EDA) and computer-aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer-readable storage medium accessible to the computing system. Likewise, the code representative of one or more phases of the design or fabrication of an IC device may be stored in and accessed from the same computer-readable storage medium or a different computer-readable storage medium.

A computer-readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

In some implementations, certain aspects of the techniques described above may be implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM), or other non-volatile memory device or devices, and the like. The executable instructions stored on the non-transitory computer-readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still, further, the order in which activities are listed is not necessarily the order in which they are performed. Also, the concepts have been described with reference to specific implementations. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

The preposition "or" as used in the context of "at least one of A, B, or C", is herein used to signify an "inclusive or." That is to say, in the above and similar contexts, or is used to signify "at least one of or any combination thereof." For example, "at least one of A, B, and C" is used to signify "at least one of A, B, C, or any combination thereof."

Benefits, other advantages, and solutions to problems have been described above with regard to specific implementations. However, the benefits, advantages, solutions to problems, and any feature(s) that may cause any benefit, advantage, or solution to occur or become more pronounced are not to be construed as a critical, required, or essential feature of any or all the claims. Moreover, the particular implementations disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular implementations disclosed above may be altered or modified and all such variations are considered within the scope of the disclosed subject matter. Accordingly, the protection sought herein is as set forth in the claims below.

What is claimed is:

1. A method for speculative prefetching into a cache in a data fabric, comprising:
  selectively issuing, by a processing device to a cache controller of a cache in a data fabric, a speculative prefetch request for a last-level cache (LLC) based on the speculative prefetch request meeting a selection threshold; and
  based on receiving a prefetch fill data based on the speculative prefetch request for the LLC, filling at least a portion of the cache in the data fabric with the prefetch fill data.

2. The method of claim 1, further comprising:
  in response to a cache miss in the LLC, retrieving the prefetch fill data from the cache in the data fabric.

3. The method of claim 1, further comprising:
  determining a prefetch analytic based on the speculative prefetch request; and comparing the prefetch analytic to the selection threshold to determine whether the speculative prefetch request meets the selection threshold.

4. The method of claim 3, wherein the prefetch analytic comprises a confidence of the speculative prefetch request and the selection threshold comprises a predetermined confidence.

5. The method of claim 3, wherein the prefetch analytic comprises an access type of the speculative prefetch request and the selection threshold comprises a predetermined access type.

6. The method of claim 3, further comprising:
  selectively issuing the speculative prefetch request based on the comparison of the prefetch analytic to the selection threshold indicating that the speculative prefetch meets the selection threshold.

7. The method of claim 1, wherein the speculative prefetch request is issued in response to a fill buffer associated with the LLC being full.

8. The method of claim 1, further comprising:
  downgrading a speculative prefetch request for a higher-level cache to produce the speculative prefetch request for the LLC.

9. A system comprising:
  a last-level cache (LLC) coupled to a cache in a data fabric; and
  a processor coupled to the LLC and cache in the data fabric, the processor configured to:
    selectively issue, to a cache controller of the cache in the data fabric, a speculative prefetch request for the LLC based on the speculative prefetch request meeting a selection threshold; and
    based on receiving a prefetch fill data based on the speculative prefetch request for the LLC, fill at least at least a portion of the cache in the data fabric with the prefetch fill data.

10. The system of claim 9, wherein the processor is further configured to:
  in response to a cache miss in the LLC, retrieve the prefetch fill data from the cache in the data fabric.

11. The system of claim 9, wherein the processor is further configured to:
  determine a prefetch analytic based on the speculative prefetch request; and
  compare the prefetch analytic to the selection threshold to determine whether the speculative prefetch request meets the selection threshold.

12. The system of claim 11, wherein the prefetch analytic comprises a data type of the speculative prefetch request and the selection threshold comprises a predetermined data type.

13. The system of claim 11, wherein the prefetch analytic comprises an initiator of the speculative prefetch request and the selection threshold comprises a predetermined initiator.

14. The system of claim 11, wherein the processor is further configured to:
  selectively issue the speculative prefetch request based on the comparison of the prefetch analytic to the selection threshold indicating that the speculative prefetch request meets the selection threshold.

15. The system of claim 9, wherein the processor is further configured to issue the speculative prefetch request in response to a queue associated with the LLC being full.

16. The system of claim 9, wherein the processor is further configured to:
  downgrade a speculative prefetch request for a higher-level cache to produce the speculative prefetch request for the LLC.

17. A method for speculative prefetching into a cache in a data fabric, comprising:
  selectively issuing, by a processing device coupled to a last-level cache (LLC) and a cache in a data fabric, a speculative prefetch request for the LLC to a cache controller of the cache in the data fabric based on a prefetch analytic of the speculative prefetch request meeting a selection threshold; and
  based on receiving a prefetch fill data based on the speculative prefetch request for the LLC, filling at least a portion of the cache in the data fabric with the prefetch fill data.

18. The method of claim 17, wherein selectively issuing the speculative prefetch request comprises:
  comparing the prefetch analytic to a selection threshold; and
  selectively issuing the speculative prefetch request based on the comparison indicating that the prefetch analytic meets the selection threshold.

19. The method of claim 17, further comprising:
  in response to a cache miss in the LLC, retrieving the prefetch fill data from the cache in the data fabric.

20. The method of claim 17, wherein the prefetch analytic comprises a confidence of the speculative prefetch request and the selection threshold comprises a predetermined confidence.

* * * * *